No. 674,210. Patented May 14, 1901.
G. J. LOOMIS.
MUFFLER.
(Application filed Oct. 9, 1900.)
(No Model.)
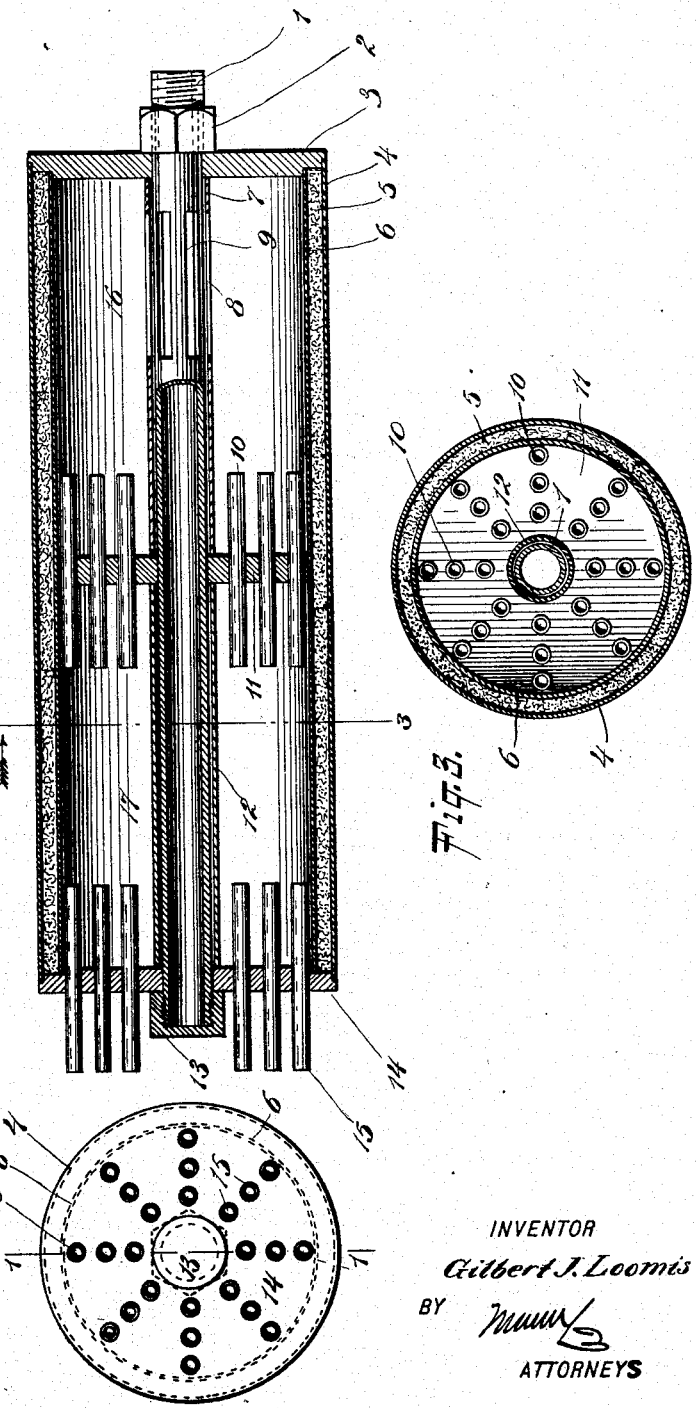
WITNESSES:
William P. Goebel.
John Lotka
INVENTOR
Gilbert J. Loomis
BY
ATTORNEYS

UNITED STATES PATENT OFFICE.

GILBERT J. LOOMIS, OF WESTFIELD, MASSACHUSETTS.

MUFFLER.

SPECIFICATION forming part of Letters Patent No. 674,210, dated May 14, 1901.

Application filed October 9, 1900. Serial No. 32,477. (No model.)

*To all whom it may concern:*

Be it known that I, GILBERT J. LOOMIS, a citizen of the United States, and a resident of Westfield, in the county of Hampden and State of Massachusetts, have invented a new and Improved Muffler, of which the following is a full, clear, and exact description.

My invention relates to mufflers—that is, to devices for deadening the noise produced by steam, vapor, or gas discharged under pressure into the atmosphere—and is particularly adapted for use in connection with the exhaust-pipe of an automobile to do away as fully as possible with the unpleasant puffing noise observable in many automobiles and to cause the exhaust to pass into the atmosphere in the nature of a steady stream. The construction by which I secure this result will be fully described hereinafter and the features of novelty pointed out in the appended claims.

Reference is to be had to the accompanying drawings, forming a part of this specification, in which similar characters of reference indicate corresponding parts in all the figures.

Figure 1 is a longitudinal section of my improved muffler on line 1 1 of Fig. 2. Fig. 2 is an end view thereof from the left-hand side of Fig. 1, and Fig. 3 is a cross-section on line 3 3 of Fig. 1.

The improved muffler comprises a central pipe 1, adapted for connection with the exhaust-port of the engine and having an exterior screw-thread at each end. Upon one end of the pipe 1 screws a cap 13, engaging a head 14, while the other end of the pipe 1 receives a nut 2, engaging a head 3. The heads 3 and 14 are provided with two shoulders, forming seats for an inner shell 6 and an outer shell 4, made of sheet-iron or other suitable material. The cap 13 and nut 2 serve to clamp the heads and shells together. The space 5 between the two shells is preferably filled with asbestos, sand, or other material suitable for deadening sound. Within the hollow body formed by the shells 4 6 and the heads 3 14 I arrange a partition or diaphragm 11, which is held against longitudinal movement by means of sleeves 7 12, engaging the heads and the diaphragm and slipped over the central tube 1. The diaphragm divides the hollow body into two compartments 16 and 17, respectively, and the sleeve 7 in the compartment 16 is provided with apertures or slots 8, registering with similar apertures 9 in the pipe 1. The partition 11 carries a series of tubes 10, projecting into the compartments 16 and 17 and establishing a communication between them, and similar tubes 15 project from the outlet-head 14 into the outlet-compartment 17 and into the atmosphere.

In operation the exhaust enters the pipe 1 at the inlet-head 3 and travels the entire length of the pipe until it strikes the cap 13. Then the exhaust rebounds in the pipe 1 and passes into the compartment 16 through the apertures 9 and 8. The exhaust expands in said compartment and being thus under a reduced pressure passes through the tubes 10 of the partition 11 into the other chamber or compartment 17. Here a further expansion takes place, and finally the exhaust issues into the atmosphere through the pipes 15 in a series of narrow jets under a slight pressure. The spent motive agent passes into the atmosphere in a practically steady stream, this result being due to the considerable reduction of pressure in the chamber 17 and to the breaking up of the exhaust into fine jets by the tubes 11 and 15. The filling of the space 5 with asbestos or other suitable material also contributes to deaden the sound.

I desire it to be understood that various modifications may be made without departing from the nature of my invention as defined in the appended claims. For instance, the number of partitions, such as 11, may be increased, and a single shell can be employed to connect the heads 3 14, although I prefer the double shell with the intermediate sound-deadening material. The muffler may be disposed horizontally, as shown, or vertically, with the discharge-tubes 15 at the lower end or in any other position that may be suitable in each individual case.

Having thus described my invention, I claim as new and desire to secure by Letters Patent—

1. A muffler comprising a pipe closed at one end, heads fitted on said pipe, a shell held between said heads, forming a hollow body which surrounds the pipe, the latter being provided adjacent to the inlet-head with apertures leading into said body, discharge-tubes extending into the atmosphere through the other or outlet head and projecting from the latter outwardly, a partition surrounding the pipe between the said apertures thereof and the outlet-head, and tubes extending through the said partition and projecting from the same at each side thereof.

2. A muffler comprising a pipe closed at one end, a hollow body surrounding said pipe, the latter being provided with apertures leading into the said body, discharge-tubes leading from the interior of the body into the atmosphere, a partition located within the body between the said discharge-tubes and the said apertures in the pipe, and tubes extending lengthwise of the body through the said partition and projecting both in advance and in the rear thereof.

In testimony whereof I have signed my name to this specification in the presence of two subscribing witnesses.

GILBERT J. LOOMIS.

Witnesses:
S. AUGUSTUS ALLEN,
FREDERIC A. BALLOU.